(12) United States Patent
Wang

(10) Patent No.: US 8,404,339 B2
(45) Date of Patent: Mar. 26, 2013

(54) PREPREG CONTAINING EPOXY RESIN WITH IMPROVED FLEXURAL PROPERTIES

(75) Inventor: Yen-Seine Wang, San Ramon, CA (US)

(73) Assignee: Hexcel Corporation, Dublin, CA (US)

( * ) Notice: Subject to any disclaimer, the term of this patent is extended or adjusted under 35 U.S.C. 154(b) by 257 days.

(21) Appl. No.: 13/012,830

(22) Filed: Jan. 25, 2011

(65) Prior Publication Data

US 2011/0118386 A1 May 19, 2011

Related U.S. Application Data

(62) Division of application No. 12/468,926, filed on May 20, 2009, now Pat. No. 7,897,703.

(51) Int. Cl.
*B32B 25/02* (2006.01)
*B32B 27/38* (2006.01)
*C08K 7/02* (2006.01)
*C08K 7/14* (2006.01)
*C08L 63/00* (2006.01)

(52) U.S. Cl. ............ 428/297.4; 428/413; 523/466; 523/468; 525/423; 525/486; 525/523

(58) Field of Classification Search .............. None
See application file for complete search history.

(56) References Cited

U.S. PATENT DOCUMENTS

| | | | | |
|---|---|---|---|---|
| 4,640,972 A | * | 2/1987 | Irwin | 528/188 |
| 4,721,755 A | * | 1/1988 | Maatman | 525/432 |
| 5,218,062 A | * | 6/1993 | Earls et al. | 525/526 |
| 6,353,079 B1 | * | 3/2002 | Walker et al. | 528/87 |
| 7,897,703 B2 | * | 3/2011 | Wang | 525/523 |

FOREIGN PATENT DOCUMENTS

| | | | |
|---|---|---|---|
| JP | 01188521 A | * | 7/1989 |
| WO | WO 94/06876 A1 | * | 3/1994 |
| WO | WO 2007/016516 A2 | * | 2/2007 |

OTHER PUBLICATIONS

HCAPLUS accession No. 1984:140125 for the Indian Journal of Technology article by Varma, "Amine-cured epoxy/glass fiber composites," vol. 21, No. 7, 1983, one page.*
Jang et al., Reaction Pathway of Liquid Crystalline Epoxy Resin/Aromatic Diamine Curing System, Macromol. Rapid Commun., vol. 21, 2000, pp. 960-963.*

* cited by examiner

*Primary Examiner* — Robert Sellers
(74) *Attorney, Agent, or Firm* — W. Mark Bielawski; David J. Oldenkamp

(57) ABSTRACT

Prepreg that contains epoxy resin compositions that include an epoxy resin component and a curative powder comprising particles of 4,4'-diaminobenzanilide (DABA) wherein the size of the DABA particles is less than 100 microns and wherein the median particle size is below 20 microns.

20 Claims, 1 Drawing Sheet

PREPREG CONTAINING EPOXY RESIN WITH IMPROVED FLEXURAL PROPERTIES

This application is a divisional of U.S. application Ser. No. 12/468,926 which was filed on May 20, 2009, U.S. Pat. No. 7,897,703.

BACKGROUND OF THE INVENTION

1. Field of the Invention

The present invention relates generally to high performance epoxy resins that are used in the aerospace industry. More particularly, the present invention relates to improving the flexural strength and strain to failure of such epoxy resins.

2. Description of Related Art

Epoxy resins that are reinforced with a fibrous material, such as glass or carbon fiber, are used in a wide variety of situations where high structural strength and low-weight are required. Composite materials that use a high performance epoxy resin matrix are especially popular in the aerospace industry where weight and structural strength are important engineering and design considerations. High performance epoxy resins may include one or more thermoplastic materials that provide "toughening" of the epoxy resin. In addition, various combinations of curative agents are used to provide optimum curing and resin strength. Although such high performance epoxy resin composite materials are desirable because of their relatively high strength to weight ratio, they do present some specific issues with respect to flexibility and flexural properties. The flexural properties of an epoxy resin are important for design considerations because the overall strength, damage tolerance and resistance to impact of composite parts made using such epoxy resins are dependent upon these properties.

Flexural strength, flexural modulus and strain to failure are flexural properties of a cured epoxy resin that are routinely measured in the aerospace industry. The flexural strength of a cured epoxy resin is defined as its ability to resist deformation under a load. The flexural strength is determined by measuring the amount of force or load that is required to make a cured epoxy resin test specimen fail. For materials that deform significantly without breaking, the load at failure is the point at which the specimen's resistance to bending drops dramatically. The flexural modulus is the ratio of the stress (load) to strain (flexing) during deformation of the cured epoxy resin. The flexural modulus is determined by using the values obtained during testing of flexural strength to calculate the flexural modulus. Strain to failure is a measure of the degree to which a specimen will bend (strain) before it fails.

ASTM D790 and ISO 178 are two standard test procedures that are used to determine the flexural properties of cured epoxy resins. These two procedures are basically the same. A test specimen is supported on a support span and the load (stress) is applied to the center by a loading nose to produce a three-point bending (strain) at a specified rate. The various parameters for the test procedure include the size of the support span, the speed of loading and the maximum deflection for the test. These parameters depend upon the size of the test specimen, which differs between the ASTM D970 and ISO 178 protocols. A common size for the test specimen is 3.2 mm×12.7 mm×125 mm for the ASTM D790 test and 10 mm×4 mm×80 mm for the ISO 178 tests.

The development of high performance epoxy resins where the flexural strength and strain to failure are made as high as possible without deleteriously affecting the flexural modulus has been, and continues to be, a major goal in the aerospace composites industry.

Epoxy resin formulations typically include one or more curative agents. One such curative agent is 4,4'-diaminobenzanilide (DABA). DABA is typically supplied as a powder that is mixed directly with the epoxy resin. It would be desirable to provide epoxy resins that are cured with DABA and which exhibit improved flexural strength and strain to failure without negatively affecting the flexural modulus of the DABA-cured epoxy resin.

SUMMARY OF THE INVENTION

In accordance with the present invention, it was unexpectedly discovered that the flexural strength and strain to failure of high performance epoxy resins can be increased if a powder containing specially sized particles of 4,4'-diaminobenzanilide (DABA) is used as the curative agent. It was also discovered that these unexpected increases in flexural strength and strain to failure could be achieved while keeping the flexural modulus at or above levels that are comparable to existing high performance epoxy resins that are cured using conventional curatives. In addition, the cured resins of the present invention exhibit relative high glass transition temperatures ($T_g$).

The present invention covers uncured epoxy resin compositions that include an epoxy resin component and a curative powder that is made up of 4,4'-diaminobenzanilide (DABA) particles which have sizes that are less than 100 microns and wherein the median particles size is below 20 microns. Epoxy resins that are cured with this specially sized DABA curative powder have flexural strengths and strain to failure levels that are significantly higher than those observed for epoxy resins cured with commercially available DABA powders that contain larger particle sizes. The cured resins were also found to have an unexpectedly high glass transition temperature.

In addition to the uncured epoxy resin composition, the present invention covers use of the epoxy resin composition as the matrix resin for prepreg as well as other combinations of the uncured epoxy composition with fibrous materials. In addition, the invention covers cured epoxy resin compositions and fiber reinforced composite parts wherein the resin matrix is a cured epoxy resin composition in accordance with the present invention. The invention also covers methods for making uncured epoxy resin compositions and methods for making cured parts that incorporate the epoxy resin composition.

The above described and many other features and attendant advantages of the present invention will become better understood by reference to the following detailed description when considered in conjunction with the accompanying drawings.

DETAILED DESCRIPTION OF THE INVENTION

Figure 1:
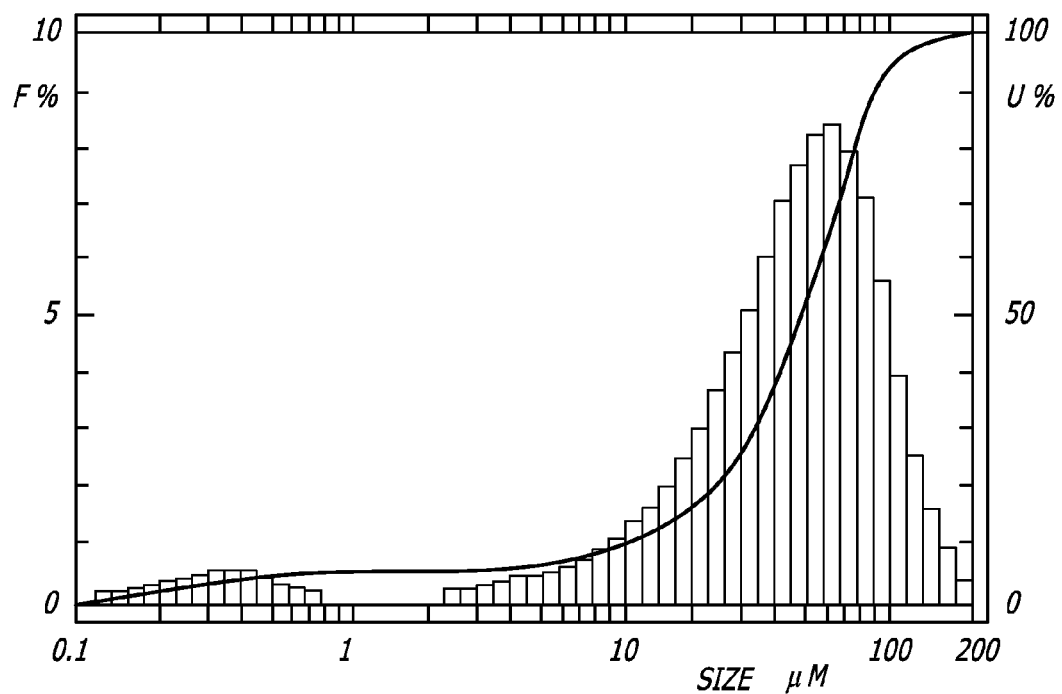
FIG. 1 is a graph showing the particle size distribution of DABA curative powder as received from a commercial supplier.

Epoxy resin compositions in accordance with the present invention may be used in a wide variety of situations where a cured epoxy resin having a high flexural strength and strain to failure is desired. The epoxy resin compositions are also useful in those situations where glass transition temperatures ($T_g$) of the cured resin above 220° C. are desired. Although the epoxy resin compositions may be used alone, the compositions are generally combined with a fibrous support to form composite materials. The composite materials may be in the form of a prepreg or cured final part. Although the composite materials may be used for any intended purpose, they are preferably used in aerospace applications for both structural and non-structural parts.

For example, the epoxy resin may be used to form composite material that is used in structural parts of the aircraft, such as fuselages, wings and tail assemblies. The epoxy resin may also be used to make composite material parts that are used in non-structural areas of the airplane. Exemplary non-structural exterior parts include engine nacelles and aircraft skins. Exemplary interior parts include the aircraft galley and lavatory structures, as well as window frames, floor panels, overhead storage bins, wall partitions, wardrobes, ducts, ceiling panels and interior sidewalls.

The epoxy resin compositions of the present invention include from 55 to 75 weight percent of an epoxy resin component that includes one or more epoxy resins. The epoxy resins may be selected from any of the epoxy resins that are used in high performance aerospace epoxies. Difunctional, trifunctional and tetrafunctional epoxy resins may be used. Preferably, the epoxy resin component will be made up substantially of a trifunctional epoxy compound. If desired, tetrafunctional epoxies may be included. The relative amounts of trifunctional and tetrafunctional epoxies may be varied. However, it is preferred that the amount of trifunctional epoxy is greater than or equal to the amount of tetrafunctional epoxy.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups in the backbone of the compound. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group.

Suitable trifunctional epoxy resins, by way of example, include those based upon: phenol and cresol epoxy novolacs; glycidyl ethers of phenol-aldehyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred trifunctional epoxy is the triglycidyl ether of para aminophenol, which is available commercially as Araldite MY 0500 or MY 0510 from Huntsman Advanced Materials (Monthey, Switzerland). Another preferred trifunctional epoxy resin is triglycidyl meta-aminophenol. A particularly preferred trifunctional epoxy is triglycidyl meta-aminophenol, which is available commercially from Huntsman Advanced Materials (Monthey, Switzerland) under the trade name Araldite MY0600, and from Sumitomo Chemical Co. (Osaka, Japan) under the trade name ELM-120.

Suitable tetrafunctional epoxy resins, by way of example, include those based upon: phenol and cresol epoxy novolacs; glycidyl ethers of phenol-aldehyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred tetrafunctional epoxy is N,N,N',N'-tetraglycidyl-m-xylenediamine, which is available commercially as Araldite MY0720 or MY0721 from Huntsman Advance Materials (Monthey, Switzerland).

If desired, the epoxy resin component may also include a difunctional epoxy, such a Bisphenol-A (Bis-A) or Bisphenol-F (Bis-F) epoxy resin. Exemplary Bis-A epoxy resin is available commercially as Araldite GY6010 (Huntsman Advanced Materials) or DER 331, which is available from Dow Chemical Company (Midland, Mich.). Exemplary Bis-F epoxy resin is available commercially as Araldite GY281 and GY285 (Huntsman Advanced Materials). The amount of Bis-A or Bis-F epoxy resin present in the epoxy resin component may be varied. It is preferred that no more than 20 weight percent of the total epoxy resin component be difunctional epoxy resin.

The epoxy resin component may optionally include from 5 to 15 weight percent of a thermoplastic toughening agent. Thermoplastic toughening agents are well-know for use in preparing high performance epoxy resins. Exemplary toughening agents include polyether sulfone (PES), polyetherimide (PEI), polyamide (PA) and polyamideimide (PAI). PES is available commercially from a variety of chemical manufacturers. As an example, PES is available from Sumitomo Chemical Co. Ltd. (Osaka, Japan) under the tradename Sumikaexcel 5003p. Polyetherimide is available commercially as ULTEM 1000P from Sabic (Dubai). Polyamideimide is available commercially as TORLON 4000TF from Solvay Advanced Polymers (Alpharetta, Ga.). The thermoplastic component is preferably supplied as a powder that is mixed in with the epoxy resin component prior to addition of the curative agent.

The epoxy resin composition may also include additional ingredients, such as performance enhancing and/or modifying agents provided that they also do not adversely affect the flexural strength, strain to failure and flexural modulus of the cured resin. The performance enhancing or modifying agents, for example, may be selected from: flexibilizers, particulate fillers, nanoparticles, core/shell rubber particles, flame retardants, wetting agents, pigments/dyes, conducting particles, and viscosity modifiers. It is preferred that the resin composition does not include additional ingredients. It is preferred that the resin composition be limited to the epoxy component and the specially sized curative powder, as described below. More preferably, the resin composition will be composed of a trifunctional epoxy and the specially sized curative powder as the curative agent. Most preferred is the combination of specially sized DABA curative powder and a meta-substituted trifunctional epoxy, such as MY0600.

In accordance with the present invention, the epoxy resin component is cured using powdered 4,4'-diaminobenzanilide (DABA) as the curative agent. The powdered DABA curative is preferably prepared by taking commercially available DABA powder and passing it through a No. 400 sieve (0.0015 inch openings). The particle size distribution of a typical commercially available DABA powder is shown in FIG. 1. Such DABA powder is available from any number of commercial sources. Exemplary commercial suppliers include Acros Organics (Fair Lawn, N.J.) and Alfa Aesar (Ward Hill, Mass.). The powders are generally at least 95 weight % pure DABA and more typically are at least 98 weight % pure DABA. The particle size distribution of the commercial powder was determined using a Horiba LA-500 Particle Size Analyzer. The "as received' commercial powder included particles as large as 200 microns and as small as 0.2 microns. The median particle size is about 48 microns and the mean particle size is about 53 microns. About 38 percent of the particles have a particle size of between 10 and 50 microns and about 14 percent of the particles have particle sizes that are over 100 microns. About 40 percent of the particles have particle sizes between 50 and 100 microns.

Figure 2:
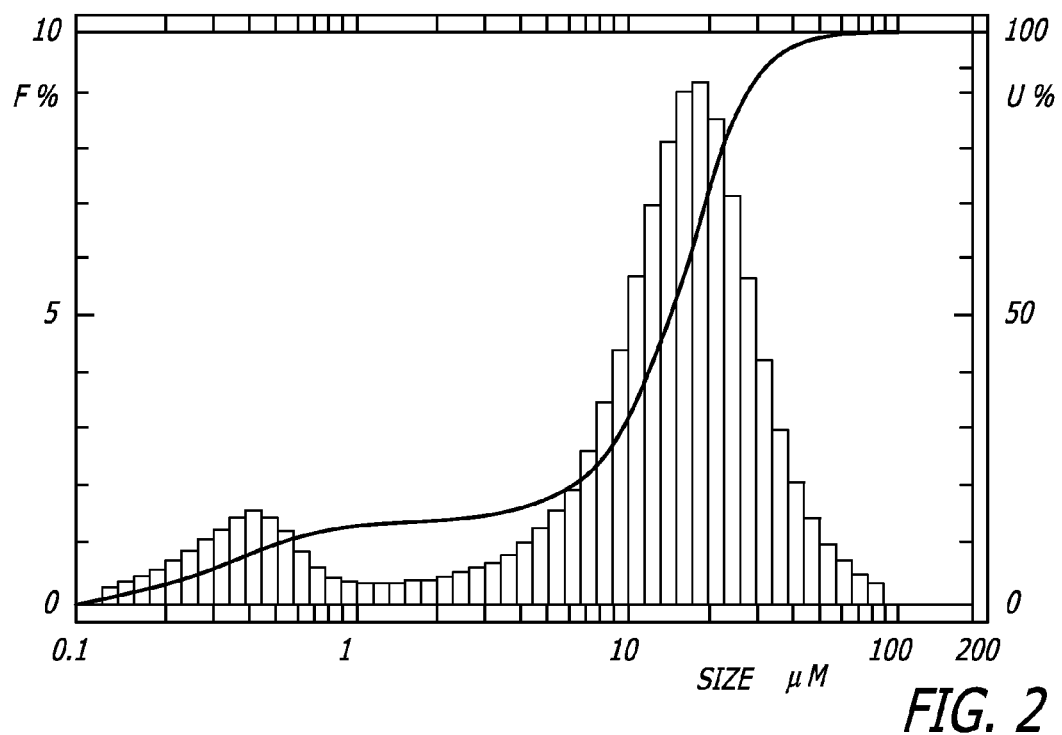
FIG. 2 is a graph showing the particle size distribution of DABA curative powder in accordance with the present invention.

When the above described commercial DABA powder is passed through a No. 400 sieve, the resulting specially sized powder has a particle distribution curve as shown in FIG. 2, as measured using the Horiba LA-500 Particle Size Analyzer. Specially sized powdered DABA curatives having the particle size distribution as shown in FIG. 2 provide flexural strengths, strain to failure and $T_g$ levels that are significantly higher than those observed for epoxy resins cured with commercially available DABA powders that contain larger particles as shown in FIG. 1.

The specially sized DABA powder in accordance with the present invention should have few, if any, particles that are larger than 100 microns. The specially sized powder will also contain few, if any, particles that are sized below about 0.1 micron. Smaller particle sizes are possible and may be included in the specially sized powder. However, conventional grinding and sieving techniques generally do not produce a large number of particles that are smaller than 0.1 micron. Accordingly, the preferred lower limit for particle size is about 0.1 micron. The median particle size for the powder should be below 20 microns. Preferably, the median particle size will be between 10 and 20 microns with the particularly preferred median particle size being about 15 microns. The mean particle size for the powder should also be below 20 microns. Preferably, the mean particle size will be between 10 and 20 microns with the particularly preferred mean particle size being about 17 microns. At least 70 percent of the particles should have particle sizes of below 50 microns. Preferably about 85 percent of the particles will have particle sizes of below 50 microns and most preferred are powders were at least 95 percent of the particles have particle sizes below 50 microns. It is also preferred that at least about 16 percent of the particles have particle sizes of less than 5 microns.

The specially sized DABA powder may be made in any number of ways provided that the above described particle size distribution is obtained. For example, relatively large pieces of DABA may be ground up and passed through various sieves to obtain a particles size distribution that is similar to the commercially available powder shown in FIG. 1. The resulting powder is then passed through a No. 400 sieve to obtain a powder made up of particles that meet the particle size distribution ranges set forth above. It is preferred that a powder having a particle size distribution that is the same or similar to that shown in FIG. 1 is purchased or prepared and then passed through a No. 400 sieve to obtain the specially sized DABA powder. If desired, the commercially obtained powder having a particle size distribution as shown in FIG. 1 may be ground further prior to passing through a No. 400 sieve. The specially sized DABA powder should be at least 95 weight % DABA. More preferably, the powder should be at least 98 weight % pure DABA.

The amount of specially sized DABA curative powder that is mixed with the epoxy resin component to form the uncured epoxy resin composition may be varied so as to provide cured resins having flexural strengths of at least 25 ksi and strain to failure values of at least 4 percent, as measured using ASTM D970. The flexural modulus should be about 790 ksi or higher and the $T_g$ should be 220° C. or higher. Preferably, the stoichiometric ratio of epoxy component to DABA will be between 1.0 to 1.0 and 1.0 to 0.6. The preferred stoichiometric ratio of epoxy component to DABA is about 1.0 to 0.85. Minor amounts of other curatives may be included in the epoxy resin composition. However, it is preferred that at least 80 weight percent of the curative for the epoxy resin component be the specially sized DABA curative powder. Most preferred are uncured epoxy resin composition where the curative is at least 95 weight percent of the specially sized DABA curative powder. Exemplary other curatives that may be added include 3,3'-diaminodiphenylsulfone (3,3'-DDS) and 4,4'-diaminodiphenylsulfone (4,4'-DDS).

The epoxy resin composition of the present invention is made in accordance with standard resin processing procedures for high performance epoxy resins. If more than one epoxy is used, the epoxy resins are mixed together at room temperature to form an epoxy resin component. Any thermoplastic component or other additive is added and the mixture is then heated, if necessary, to dissolve the thermoplastic or other additive. The mixture is then cooled down, if necessary, to a temperature that is 65° C. or below (preferably room temperature) and the specially sized DABA curative powder is mixed into the resin mixture to form the final uncured epoxy resin composition. The DABA curative powder should not be dissolved prior to addition to the epoxy resin component. As shown in Comparative Example 3, pre-dissolving the DABA powder in solvent, as an alternative to reducing the particle size of the powder, does not provide the improved flexural properties obtained when the specially sized DABA powder is used as the curative agent.

The uncured epoxy resin composition may be used in any application where a high performance epoxy resin is needed. However, the principal use for such resins is in combination with a fibrous reinforcement to form a prepreg that is later used to form a cured composite part. The uncured epoxy resin composition is applied to the fibrous reinforcement in accordance with any of the known prepreg manufacturing techniques. The fibrous reinforcement may be fully or partially impregnated with the epoxy resin composition during formation of the prepreg. The prepreg is typically covered on both sides with a protective film and rolled up for storage and shipment at temperatures that are typically kept well below room temperature to avoid premature curing. Any of the other prepreg manufacturing processes and storage/shipping systems may be used, if desired.

The fibrous reinforcement may be selected from hybrid or mixed fiber systems that comprise synthetic or natural fibers, or a combination thereof. Exemplary preferred fibrous reinforcement materials include fiberglass, carbon fibers or aramid (aromatic polyamide) fibers. The fibrous reinforcement is preferably composed of carbon fibers.

The fibrous reinforcement may comprise cracked (i.e. stretch-broken) or selectively discontinuous fibers, or continuous fibers. The fibrous reinforcement may be in a woven, non-crimped, non-woven, unidirectional, or multi-axial textile structure form, such as quasi-isotropic chopped pieces of unidirectional fibers. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, towpregs, webs, or chopped lengths (chopping and slitting operations may be carried out at any point after the epoxy resin composition is impregnated into the fibrous reinforcement). The prepreg may be used as an adhesive or surfacing film and may additionally have embedded carriers in various forms both woven, knitted, and non-woven.

The prepreg may be molded using any of the standard techniques used to form composite parts. Typically, one or more layers of prepreg are place in a suitable mold and cured to form the final composite part. Prepreg containing the uncured epoxy resin composition of the invention may be fully or partially cured using any suitable temperature, pressure, and time conditions known in the art. Typically, the prepreg will be cured in an autoclave at temperatures of between 160° C. and 190° C. with curing temperatures of between about 175° C. and 185° C. being preferred. Compression molding of quasi-isotropic chopped prepreg or molding material is a preferred procedure. The quasi-isotropic chopped prepreg is the same as HexMC® compression molding material that is available from Hexcel Corporation (Dublin, Calif.), except that the resin component of this quasi-isotropic chopped prepreg is made in accordance with the present invention. Such quasi-isotropic materials are described in EP 113431 B1 and U.S. patent application Ser. No. 11/476,965.

Examples of practice are as follows:

COMPARATIVE EXAMPLE 1

A comparative epoxy resin sample was prepared in which 20.00 g of MY600 (triglycidyl meta-aminophenol) epoxy was mixed with 9.14 g of 3,3'-DDS and 1.02 g of 4,4'-DDS, which are conventional curing agents that are used to cure high performance epoxy resins. The epoxy and curative agents were mixed together at room temperature and the resulting resin was cured at 177° C. for 2 hours to form cured resin samples that were tested according to ASTM D790. The flexural modulus of the cured resin sample was 749 ksi. The flexural strength was 31.1 ksi and the strain to failure was 4.0%. The $T_g$ of the cured resin was 205° C.

COMPARATIVE EXAMPLE 2

A comparative epoxy resin sample was prepared in which 21.20 g of MY600 epoxy was mixed with 9.86 g of DABA curative powder (as received from the supplier), which provided a stoichiometric ratio of MY600 to DABA of 1:0.85. The particle size distribution of the DABA curative powder is shown in FIG. 1. The median particle size for the powder was about 48 microns and the mean particle size was about 53 microns. About 14 percent of the particles had particle sizes of between 100 and 200 microns and about 8 percent had particle sizes of less than 15 microns. About 70% of the particles had particle sizes between 150 microns and 30 microns The epoxy and DABA curative powder were mixed together at room temperature and the resulting resin was cured at 177° C. for 2 hours to form cured resin samples that were tested according to ASTM D790. The flexural modulus of the cured resin sample was 745 ksi. The flexural strength was 12.2 ksi and the strain to failure was 2.4%. The $T_g$ of the cured resin sample was 214° C.

COMPARATIVE EXAMPLE 3

Three comparative epoxy resin samples (CA, CB and CC) were prepared by mixing MY600 epoxy with differing amounts of DABA curative. Instead of adding the DABA curative powder directly to the epoxy resin as in Comparative Example 2, the powders were dissolved in dioxolane prior to being added to the resin. Resin CA contained 17.92 g of MY600 and 10.11 g of DABA, which provided a stoichiometric ratio of MY600 to DABA of 1:1. Resin CB contained 21.20 g of MY600 and 9.86 g of DABA (stoichiometric ratio of 1:0.85). Resin CC contained 21.75 g of MY600 and 8.82 g of DABA (stoichiometric ratio of 1:0.75).

The epoxy and dissolved DABA powders were mixed together at room temperature to form the three comparative mixtures. The mixtures were heated from room temperature to 50° C. under 30 inches Hg for about 2 hours to evaporate the solvent. The resulting resins (CA, CB and CC) were cured at 177° C. for 2 hours to form cured comparative resin samples that were tested according to ASTM D790. The flexural modulii of the cured resin samples were: 825 ksi for Resin CA; 863 ksi for Resin CB; and 816 ksi for Resin CC. The flexural strengths were: 13.9 ksi for Resin CA; 17.4 ksi for Resin CB; and 19.2 ksi for Resin CC. The strains to failure were: 1.7% for Resin CA; 2.0% for Resin CB; and 2.4% for Resin CC. The $T_g$'s of the cured resins were 202° C., 219° C. and 199° C. for Resins CA, CB and CC, respectively.

EXAMPLE 1

Three exemplary epoxy resin samples (A, B and C) were prepared by mixing MY600 epoxy with differing amounts of DABA curative powder. Instead of adding the DABA curative powder directly to the epoxy resin as in Comparative Example 2, the powder was first passed through a 400 mesh screen to provide a powder having the particles size distribution as shown in FIG. 2. The median particle size for the powder was about 15 microns and the mean particle size was about 16 microns. None of the particle sizes were above about 100 microns and none of the particles had sizes less than 0.1 micron. About 3 percent of the particles had particle sizes of between 50 and 100 microns and about 25 percent of the particles had sizes of less than 10 microns. About 75% of the particles had particle sizes between 50 microns and 10 microns Resin A contained 17.92 g of MY600 and 10.11 g of reduced-size DABA, which provided a stoichiometric ratio of MY600 to DABA of 1:1. Resin B contained 21.20 g of MY600 and 9.86 g of reduced-size DABA (stoichiometric ratio of 1:0.85). Resin C contained 21.75 g of MY600 and 8.82 g of reduced-size DABA (stoichiometric ratio of 1:0.75).

The epoxy and reduced-size DABA powders were mixed together at room temperature to form the three exemplary resin samples A, B and C. The resulting resins were cured at 177° C. for 2 hours to form cured resin samples that were tested according to ASTM D790. The flexural modulus of the cured resin samples were: 794 ksi for Resin A; 794 ksi for Resin B; and 801 ksi for Resin C. The flexural strengths were: 27.7 ksi for Resin A; 33.6 ksi for Resin B; and 30.2 ksi for Resin C. The strains to failure were: 4.6% for Resin A; 5.6% for Resin B; and 4.9% for Resin C. The $T_g$'s of the cured resins were 229° C., 234° C. and 227° C. for Resins A, B and C, respectively.

As can be seen from the above examples, the flexural strength and strain to failure is significantly and unexpectedly higher for Example 1 than for Comparative Examples 2 and 3. In accordance with applicant's invention, it was discovered that epoxy resins cured with the reduced-size DABA curative powder of Example 1 achieved flexural strength and strain to failure levels that could not be achieved with larger sized DABA particles (Comparative Example 2) or smaller sized particles (i.e. dissolved DABA powder) as shown in Comparative Example 3. The flexural modulus of the resins cured with reduced-size DABA in accordance with the present invention also remain at a relatively high level. In addition, the $T_g$'s of the exemplary resins were unexpectedly higher that the $T_g$'s of the comparative resins.

The resins in accordance with the present invention (A, B and C) have flexural strengths and strain to failure levels that are in the same range as epoxy resins cured with conventional curatives (3,3'-DDS and 4,4'-DDS) as shown in Comparative Example 1. In addition, the flexural modulus of the DABA-cured resins of the present invention is as high or higher than the flexural modulus of comparable epoxy resins cured with conventional curatives as set forth in Comparative Example 1.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A prepreg comprising:
   a fibrous reinforcement; and
   an uncured epoxy resin composition comprising:
      an epoxy resin component; and
      a curative powder comprising particles of 4,4'-diaminobenzanilide wherein the size of said particles is less than 100 microns and wherein the median particle size is below 20 microns.
2. A prepreg according to claim 1 wherein said the median particle size is between 10 microns and 20 microns.
3. A prepreg according to claim 1 wherein said epoxy resin component consists essentially of a trifunctional epoxy.
4. A prepreg according to claim 1 wherein the stoichiometric ratio of said epoxy component to said 4,4'-diamino benzanilide is between 1.0 to 1.0 and 1.0 to 0.7.
5. A prepreg according to claim 4 wherein the stoichiometric ratio of said epoxy component and said 4,4'-diamino benzanilide is about 1.0 to 0.85.
6. A prepreg according to claim 1 wherein at least 70 percent of the particles in said curative powder have a particle size of below 50 microns.
7. A cured laminate comprising prepreg according to claim 1 that has been cured.
8. A cured laminate comprising prepreg according to claim 2 that has been cured.
9. A cured laminate comprising prepreg according to claim 3 that has been cured.
10. A cured laminate comprising prepreg according to claim 4 that has been cured.
11. A cured laminate according to claim 7 which has a flexural strength of at least 25 ksi and a strain to failure of at least 4.0 percent.
12. A method for making a prepreg comprising the step of combining a fibrous reinforcement with an uncured epoxy resin composition comprising:
    an epoxy resin component; and
    a curative powder comprising particles of 4,4'-diaminobenzanilide wherein the size of said particles is less than 100 microns and wherein the median particle size is below 20 microns.
13. A method for making a prepreg according to claim 12 wherein said median particle size is between 10 microns and 20 microns.
14. A method for making a prepreg according to claim 12 wherein said epoxy resin component consists essentially of a trifunctional epoxy.
15. A method for making a prepreg according to claim 12 wherein the stoichiometric ratio of said epoxy component to said 4,4'-diamino benzanilide is between 1.0 to 1.0 and 1.0 to 0.7.
16. A method for making a prepreg according to claim 12 wherein at least 70 percent of the particles in said curative powder have a particle size of below 50 microns.
17. A method for making a cured laminate comprising the step of curing prepreg according to claim 1.
18. A method for making a cured laminate comprising the step of curing prepreg according to claim 2.
19. A method for making a cured laminate comprising the step of curing prepreg according to claim 3.
20. A method for making a cured laminate comprising the step of curing prepreg according to claim 4.

* * * * *